(12) United States Patent
Aune

(10) Patent No.: US 7,124,102 B2
(45) Date of Patent: Oct. 17, 2006

(54) METHOD AND APPARATUS FOR DETERMINING A UNIQUE COMMUNICATION IDENTIFIER

(75) Inventor: Leif Einar Aune, Grimstad (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 863 days.

(21) Appl. No.: 09/803,022

(22) Filed: Mar. 12, 2001

(65) Prior Publication Data

US 2002/0010683 A1 Jan. 24, 2002

(30) Foreign Application Priority Data

Mar. 14, 2000 (NO) ................................ 20001316

(51) Int. Cl.
*G08Q 99/00* (2006.01)
(52) U.S. Cl. ..................... 705/35; 705/67; 705/50; 705/72; 705/75
(58) Field of Classification Search ................. 705/67
See application file for complete search history.

(56) References Cited

U.S. PATENT DOCUMENTS

| | | | |
|---|---|---|---|
| 5,636,216 A | | 6/1997 | Fox et al. |
| 5,802,283 A * | | 9/1998 | Grady et al. ................. 709/227 |
| 5,884,024 A | | 3/1999 | Lim et al. |
| 6,011,795 A | | 1/2000 | Varghese et al. |
| 6,636,502 B1 * | | 10/2003 | Lager et al. ................. 370/352 |
| 6,667,971 B1 * | | 12/2003 | Modarressi et al. ......... 370/352 |
| 6,697,354 B1 * | | 2/2004 | Borella et al. ............... 370/352 |
| 2001/0028636 A1 * | | 10/2001 | Skog et al. .................. 370/328 |
| 2002/0015403 A1 * | | 2/2002 | McConnell et al. ......... 370/352 |
| 2002/0101859 A1 * | | 8/2002 | Maclean ...................... 370/352 |
| 2002/0131447 A1 * | | 9/2002 | Krishnamurthy et al. ... 370/465 |
| 2002/0164983 A1 * | | 11/2002 | Raviv et al. ................. 455/432 |
| 2003/0039237 A1 * | | 2/2003 | Forslow ....................... 370/352 |
| 2003/0108176 A1 * | | 6/2003 | Kung et al. ............. 379/211.02 |
| 2004/0030752 A1 * | | 2/2004 | Selgas et al. ................ 709/206 |

FOREIGN PATENT DOCUMENTS

| | | |
|---|---|---|
| EP | 0 483 547 | 5/1992 |
| GB | 2 280 085 | 1/1995 |
| WO | WO 95/27942 | 10/1995 |

(Continued)

OTHER PUBLICATIONS

Network Working Group, Request for Comments: 1383, Dec. 1992, C. Huitema, An Experiment in DNS Based IP Routing.
Remote Authentication Dial in User Service (RADIUS) draft-ietf-radius-radius-v2-01.txt, C. Rigney Livingston, et al., May 1999, Radius Working Group Internet-Draft.
International Search Report dated Jul. 13, 2001.

*Primary Examiner*—Firmin Backer
(74) *Attorney, Agent, or Firm*—Nixon & Vanderhye P.C.

(57) ABSTRACT

A method for assigning unique identifiers for allowing communication between a GPRS (General Packet Radio Service) system and a RADIUS (Remote Authentication Dial In User Service) server. The method includes connecting one or more external networks to the GPRS system and identifying the or each network with an APN (Access Point Name), and assigning to an or each APN external network a gateway address. An APN-external network authentication request is passed from a GGSN (Gateway GPRS Support Node) to the RADIUS server. The RADIUS server provides to the GGSN upon such request a subscriber IP (Internet Protocol) address to be stored in the GGSN (Gateway GPRS Support Node). The subscriber IP address is unique for the respective APN external network defined in the GGSN. The GGSN combines the APN gateway address and the subscriber IP address to form a unique subscriber identifier; and sends that identifier to the RADIUS server for accounting, e.g., in the form of an ASCII string.

18 Claims, 1 Drawing Sheet

FOREIGN PATENT DOCUMENTS

| WO | WO 99/16266 | 4/1999 |
| WO | WO 00/64104 | 10/2000 |
| WO | WO 01/03402 | 1/2001 |

* cited by examiner

METHOD AND APPARATUS FOR DETERMINING A UNIQUE COMMUNICATION IDENTIFIER

FIELD OF THE INVENTION

The invention is related to RADIUS-accounting communication and in particular an arrangement and a method for assigning unique identifiers for allowing communication between a GPRS (General Packet Radio Service)-system and a RADIUS (Remote Authentication Dial In User Service) server.

BACKGROUND

RADIUS (Remote Authentication Dial In User Service) is a protocol used to authenticate remote users logging in to a network and is used as the way to authenticate users in a GPRS-system. In case the RADIUS-server provides the subscriber with a dynamic IP-address to use, a RADIUS accounting-server marks the address as used and freed.

The GPRS (General Packet Radio Service) offers a high-speed, packet-switched, mobile datacommunication network, where the subscribers can connect themselves to an external network from a mobile terminal. The GPRS system consists mainly of two nodes. One of them, the Gateway GPRS Support Node (GGSN), is an example node where this invention may be implemented.

The subscribers need an IP (Internet Protocol)-address to route packets to and from the external network. This IP-address can be provided by a RADIUS-server, in which case a unique identifier must be provided to relate the subscriber to this IP-address. The identifier is described as attribute Acct-Session-Id in IETF RFC 2139 (April 1997) "RADIUS Accounting". Due to the nature of a GPRS system, a subscriber will with a high degree of probability be connected to an external network for a long time, allocating the IP-address for an equally long period of time.

The RADIUS accounting server is requested to start an accounting session when the RADIUS client sends an accounting start request towards the RADIUS accounting server. This is done to mark the IP-address as used by the subscriber in the RADIUS accounting server. The RADIUS client in the accounting start request must give an accounting identifier, and the same accounting identifier is sent in an accounting stop request to stop the accounting and release the IP-address. The accounting identifier must be generated for each subscriber' connection receiving an IP-address from the RADIUS server, and it must be guaranteed to be unique for each connection.

The GPRS-system can be connected to several external networks, and all the networks may use the same RADIUS server. The different networks may also contain the same range of IP-addresses (private address-space), and hence the RADIUS server must be able to give out the same IP-address to subscribers belonging to the different external networks.

The accounting identifier is usually made from the time in the system acting as a client (usually an NAS) towards the RADIUS server. Other solutions are one or several counters that are incremented for each new accounting session and/or for each restart of the system. It is also known that some implementations use process identifiers as a part of the accounting identifier.

But these approaches require system resources to create and maintain the generation of the accounting identifiers. Getting the system-time does not require any storage, but may be inaccurate or inefficient in the case of a large number of simultaneous requests for the system-time. Having counters to be incremented uses system memory and computational time to recalculate the values and requires some algorithm to avoid two subscribers getting the same value of the counter. The counter must also be large enough to generate enough identifiers for all the possible subscribers. These values are not predictable and are usually based on a statistical distribution to assure uniqueness; hence they can not be guaranteed to be absolutely unique.

An object of the invention is to overcome these problems by providing unique accounting identifiers using any new system resources other than those already available.

SUMMARY

The method according to the invention includes the steps of:
 connecting one or more external networks to the GPRS system and identifying the or each network with an APN (Access Point Name), and
 assigning to an or each APN external network a gateway address, and the further steps of:
 passing an APN-external network authentication request from a GGSN (Gateway GPRS support Node) to said RADIUS server,
 providing from said RADIUS server to said GGSN upon such request a subscriber IP (Internet Protocol) address to be stored in said GGSN (Gateway GPRS Support Node), said subscriber IP address being unique for the respective APN external network defined in said GGSN,
 using said GGSN for combining the APN gateway address and the subscriber IP address, to form a unique subscriber identifier, and
 sending from said GGSN said identifier to the RADIUS server for accounting, e.g. in the form of an ASCII string.

Further characteristic features of the invention will appear from the following description and the attached patent claims, and with reference to the enclosed drawing figures.

DETAILED DESCRIPTION

Figure 1:
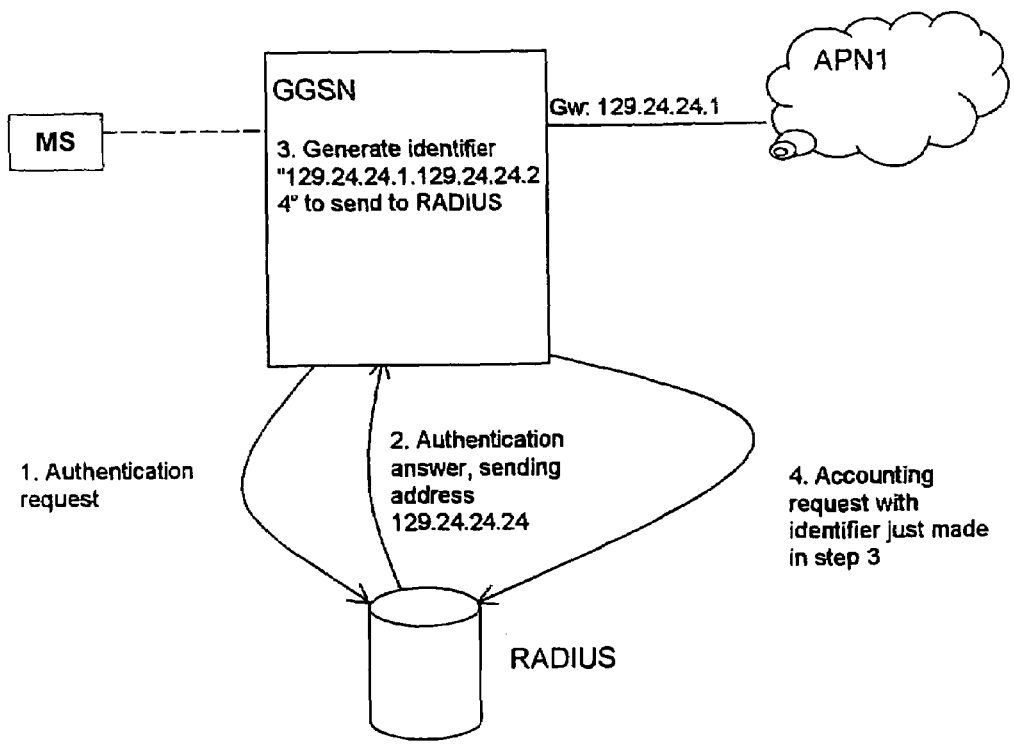
FIG. 1 illustrates the basic steps for generating an accounting identifier.

Reference is made to FIG. 1. When connecting an external network to the GPRS system, the network is identified with an Access Point Name (APN), such as e.g. APN1. Each APN is given a gateway address GW in the GGSN, as seen from the external network. By assuring that this IP-address is unique for each APN defined in the GGSN, all the external networks will have their own, unique identifier. Since two subscribers (MS) in the same external network should never use the same IP-address at the same time, subscribers connected to the same APN will always have different IP-addresses. These two IP-addresses, the gateway-address for the APN and the address assigned to the subscriber, are combined to form the accounting identifier.

When the GGSN receives an IP-address to send to the subscriber from the RADIUS-server, it looks up the gateway IP-address belonging to the external network to which the subscriber is connecting. This address has already been configured when the external network is attached to the GPRS-system, and checked to be unique within the GGSN.

To construct the accounting identifier to send to the RADIUS accounting-server, the GGSN uses these two available IP-addresses. The addresses can be appended to form a eight byte long identifier (in case of IP-addresses from IP version 4), or the numbers could be converted to ASCII numbers to make the string printable. When the numbers are converted, it would be wise to insert dots (ASCII value 46) between the decimal-groups in the addresses to be able to clearly see the addresses used in the identifier (e.g. for an operator looking into the accounting records).

Gateway IP-address=129.24.24.1
MS IP-address=129.24.24
ASCII codes: 129 24 24 1 129 24 24 24 (non printable)
Or transform the number to ASCII codes for the numbers to make them printable:
ASCII codes: 49 50 57 46 50 52 46 50 52 46 49 46 49 50 57 46 50 52 46 50 52 46 50 52 (which would be readable as "129.24.24.1.129.24.24.24")

The identifier is suitably passed to the RADIUS server as an ASCII string. (See FIG. 1).

Thus, the gateway address is the address of the GPRS-system/GGSN as seen from the external network (APN, e.g. APN1) and the subscriber could be a mobile terminal MS connected to the external network through the GPRS-system.

Figure 2:
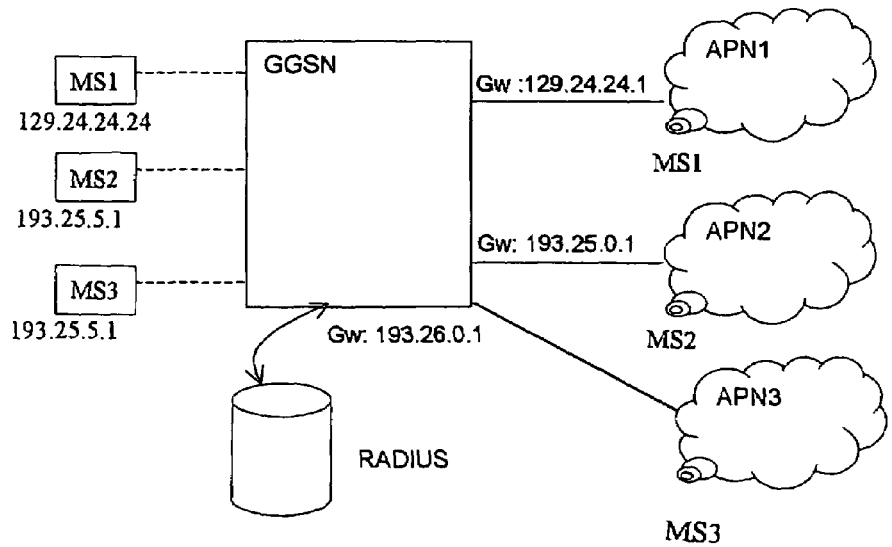
FIG. 2 illustrates three external networks with a subscriber connected to each network.

On FIG. 2, the subscribers MS1, MS2 and MS3 have for sake of reference to their respective networks APN1, APN2 and APN3 been indicated on the right hand side of the drawing figure.

The APN name and the respective APN gateway address to the GGSN seen from the network are configured, as such new network is linked to the GPRS system. The operator will normally manually assign the APN name and the gateway address, and the RADIUS server is not involved in such operation.

FIG. 2 shows three external networks connected to a GGSN node in a GPRS system. Each network has one subscriber connected, and all the three networks use the same RADIUS server for authentication and dynamic IP-address allocation for the subscribers. Even though the networks identified as APN2 and APN3 have been assigned the same IP-address to the two subscribers, the accounting identifier will be unique because of the different gateway addresses. Table I shows the generated accounting identifiers for the three subscribers.

TABLE 1

| APN | Gateway Address | Subscriber IP Address | Accounting Identifier |
|---|---|---|---|
| APN1 | 129.24.24.1 | 129.24.24 | "129.24.24.1.129.24.24.24" |
| APN2 | 193.25.01 | 193.25.5.1 | "193.25.0.1.193.25.5.1" |
| APN3 | 193.26.0.1 | 193.25.5.1 | "193.26.01.193.25.5.1" |

Advantages

The creation of the identifier used for accounting purposes described above does not involve any new resources than those already available. Since the addresses already are unique, the combination of the two addresses will form a perfectly valid identifier. This will not restrict any limitations on concurrency regarding RADIUS accounting messages, and the accounting identifier is guaranteed unique as long as the subscriber is still using the assigned IP-address (i.e. no accounting stop has been sent towards the RADIUS server). The creation of the accounting identifier will not use any extra resources whatsoever, and will always be available as long as an IP-address exists. The identifier is also very predictable. Simply by looking at it one can tell which external network the accounting record belongs to as well as determine the IP-address for the subscriber.

This invention has more general application whenever several IP-addresses are available, which together will identify the object in question uniquely. These addresses can be concatenated or otherwise combined to form a unique identifier.

The invention claimed is:

1. A method for assigning unique identifiers for allowing communication between a GPRS (General Packet Radio Service) system and a RADIUS (Remote Authentication Dial In User Service) server, the method comprising:
   connecting an external network to the GPRS system and identifying the network with an APN (Access Point Name);
   assigning to the APN external network a gateway address;
   passing an APN-external network authentication request from a GGSN (Gateway GPRS Support Node) to said RADIUS server,
   providing from said RADIUS server to said GGSN upon such request a subscriber IP (Internet Protocol) address to be stored in said GGSN (Gateway GPRS Support Node), said subscriber IP address being unique for the respective APN external network defined in said GGSN,
   using said GGSN for combining the APN gateway address and the subscriber IP address to form a unique subscriber identifier, and
   sending from said GGSN said identifier to the RADIUS server.

2. The method according to claim 1, wherein two APN external networks are provided with the same subscriber IP address, but different gateway addresses to yield different APN identifiers.

3. The method according to claim 1, wherein two or more subscribers are present in the network, each subscriber being provided with its own subscriber IP address, but the same network gateway address.

4. The method according to claim 1, wherein the identifier is a code string having as a first element the gateway address of the APN external network and as a second element the subscriber IP address appended thereto.

5. The method in claim 1, wherein said identifier is an ASCII string.

6. The method in claim 1, wherein the unique subscriber identifier is associated with a mobile subscriber and a wireless mobile terminal of the mobile subscriber, and is used for accounting by the RADIUS server.

7. Apparatus for assigning a unique subscriber identifier for a communication between a GPRS (General Packet Radio Service) system and a RADIUS (Remote Authentication Dial In User Service) server, comprising:
   means for connecting an external network to the GPRS system and identifying the external network with an APN (Access Point Name);
   means for assigning to a gateway address the APN external network;
   means for passing an APN external network authentication request to said RADIUS server;
   means for providing from said RADIUS server a subscriber IP (Internet Protocol) address associated with the APN external network;

means for combining the gateway address and the subscriber IP address to form a separate, unique subscriber identifier; and sending said unique subscriber identifier to the RADIUS server.

8. The apparatus according to claim 7, wherein two or more APN external networks have the same subscriber IP address but different gateway addresses to yield different unique APN identifiers.

9. The apparatus according to claim 7, wherein two or more subscribers are present in the external network, and each subscriber has its own subscriber IP address and the same gateway address.

10. The apparatus according to claim 7, wherein the identifier is a code string having as a first part the gateway address and as a second part the subscriber IP address.

11. The apparatus in claim 7, wherein the identifier is an ASCII string.

12. The apparatus of claim 7, wherein the subscriber identifier is associated with a mobile subscriber and a wireless mobile terminal of the mobile subscriber, and is used for accounting by the RADIUS server.

13. A method for assigning unique identifiers for allowing communication between a packet radio server and a RADIUS (Remote Authentication Dial In User Service) server, the method comprising:

connecting an external network to the packet radio server and identifying the network with an APN (Access Point Name);

assigning a gateway address to the APN external network;

making an authentication request to the RADIUS server, in response, providing a subscriber IP address;

combining the gateway address and the subscriber IP address to form a unique subscriber identifier; and sending the unique subscriber identifier to the RADIUS server.

14. The method according to claim 13, wherein two APN external networks are provided with a same subscriber IP address and with different gateway addresses to yield different APN identifiers.

15. The method according to claim 13, wherein two or more subscribers are present in the APN external network and each subscriber has its own subscriber IP address and the same gateway address.

16. The method according to claim 13, wherein the identifier is a code string having as a first part the gateway address and as a second part the subscriber IP address.

17. The method in claim 13, wherein the identifier is an ASCII string.

18. The method according to claim 13, wherein the unique subscriber identifier is associated with a mobile subscriber and a wireless mobile terminal of the mobile subscriber, and is used for accounting by the RADIUS server.

* * * * *